US012165622B2

(12) United States Patent
Evenstad et al.

(10) Patent No.: US 12,165,622 B2
(45) Date of Patent: Dec. 10, 2024

(54) AUDIO INFUSION SYSTEM AND METHOD

(71) Applicant: APPLIED INSIGHTS, LLC, Reno, NV (US)

(72) Inventors: Mark Bradford Evenstad, Reno, NV (US); William Matthew Curley, Fort Collins, CO (US); Jason Stuart Doescher, Edina, MN (US); Leigh Murray Smith, Reno, NV (US)

(73) Assignee: APPLIED INSIGHTS, LLC, Reno, NV (US)

( * ) Notice: Subject to any disclaimer, the term of this patent is extended or adjusted under 35 U.S.C. 154(b) by 0 days.

(21) Appl. No.: 18/105,373

(22) Filed: Feb. 3, 2023

(65) Prior Publication Data

US 2024/0265898 A1 Aug. 8, 2024

(51) Int. Cl.
*G10H 1/00* (2006.01)
*G10H 1/40* (2006.01)

(52) U.S. Cl.
CPC ............. *G10H 1/0025* (2013.01); *G10H 1/40* (2013.01); *G10H 2210/076* (2013.01); *G10H 2210/125* (2013.01); *G10H 2240/325* (2013.01)

(58) Field of Classification Search
CPC ................. G10H 1/0091; G10H 1/183; G10H 2210/301; G10H 2210/305; G10H 2210/155; G10H 2210/066; G10H 2240/325; G10H 2250/115; G10H 1/12; G10H 2250/061; G10H 2250/125;
(Continued)

(56) References Cited

U.S. PATENT DOCUMENTS

| | | | | |
|---|---|---|---|---|
| 9,712,916 B2 | | 7/2017 | Katsianos et al. | |
| 10,014,002 B2 * | | 7/2018 | Koretzky ................ | G10L 25/30 |

(Continued)

FOREIGN PATENT DOCUMENTS

| | | | | |
|---|---|---|---|---|
| EP | 2824663 B1 * | 8/2021 | ........... | G06F 3/0425 |
| JP | 2014515129 A * | 6/2014 | | |

(Continued)

OTHER PUBLICATIONS

Koretzky, Online Article, "Audio AI—isolating instruments from stereo music using Convolutional Neural Networks", 2019 (28 pgs).

(Continued)

*Primary Examiner* — Marlon T Fletcher
(74) *Attorney, Agent, or Firm* — STINSON LLP

(57) ABSTRACT

An audio infusion system and method are disclosed. A source audio track is separated into a plurality of audio tracks (e.g., instrumental, vocal, or mixes thereof) and the audio tracks are individually processed to generate a plurality of binaural beat tracks. At least one spatialized track is also generated by filtering the source audio track to provide a filtered track, generating one or more spatialization trajectories based on certain audio feature(s) of the source audio track (e.g., tempo) and a target end-state effect, and spatializing the filtered track using the spatialization trajectories. Other tracks may also be generated, such as one or more infrasonic tracks, ultrasonic tracks, enhanced bass tracks, and/or subharmonic tracks. The tracks may be played simultaneously or mixed for delivery to an end user device.

28 Claims, 13 Drawing Sheets

(58) Field of Classification Search
CPC ....... G10H 2210/056; G10H 2220/376; G10H 2240/026; G10H 2250/311; G10H 2250/315; G10H 2250/371; G10H 2250/395; G10H 2210/265; G10H 2210/295; G10H 2250/055
See application file for complete search history.

(56) References Cited

U.S. PATENT DOCUMENTS

| | | | | |
|---|---|---|---|---|
| 10,838,684 | B2 | 11/2020 | Tsingos et al. | |
| 11,216,244 | B2 | 1/2022 | Morsy et al. | |
| 2011/0305345 | A1* | 12/2011 | Bouchard | G10L 21/0208 704/226 |
| 2013/0177883 | A1* | 7/2013 | Barnehama | G09B 7/00 434/236 |
| 2014/0355766 | A1* | 12/2014 | Morrell | H04S 7/304 381/18 |
| 2020/0065055 | A1* | 2/2020 | Tsingos | G06F 3/162 |
| 2020/0128346 | A1* | 4/2020 | Noh | H04S 7/303 |
| 2020/0221220 | A1 | 7/2020 | Benattar | |
| 2021/0279030 | A1 | 9/2021 | Morsy et al. | |
| 2022/0060269 | A1 | 2/2022 | Kiely et al. | |
| 2022/0156036 | A1 | 5/2022 | Liu et al. | |
| 2023/0128812 | A1* | 4/2023 | Quinton | G10H 1/12 84/611 |
| 2023/0379638 | A1* | 11/2023 | Wagner | A61M 21/02 |

FOREIGN PATENT DOCUMENTS

| | | | | |
|---|---|---|---|---|
| JP | 2022531432 | A * | 7/2022 | |
| WO | WO-2006108456 | A1 * | 10/2006 | G10L 19/008 |
| WO | WO 2020/220140 | A1 | 11/2020 | |
| WO | WO 2022/126271 | A1 | 6/2022 | |
| WO | WO-2022200136 | A1 * | 9/2022 | |

OTHER PUBLICATIONS

Hacker News, Online Communication, "Manipulate audio with a simple Python library", Oct. 12, 2014 (4 pgs).

Bogdanov et al., Article, "Essentia: An Audio Analysis Library for Music Information Retrieval", Proceedings—14th International Society for Music Information Retrieval Conference, Nov. 1, 2013 (6 pgs).

Gouyon et al., Article, "Evaluating rhythmic descriptors for musical genre classification", AES 25th International Conference, Jun. 17-19, 2004 (9 pgs).

Krumhansl, et al., Article, "Tracing the Dynamic Changes in Perceived Tonal Organization in a Spatial Representation of Musical Keys", Psychological Review, vol. 89, No. 4, 334-368, 1982 (35 pgs).

Moussallam, Online Article, "Releasing Spleeter: Deezer Research source separation engine. Spleeter by deezer", Published in Deezer I/O, Nov. 4, 2019 (5 pgs).

Website Information, celemony, "What can Melodyne do?", downloaded from the internet at https://celemony.com/en/melodyne/what-can-melodyne-do on Jan. 27, 2023 (6 pgs).

Website Information, Native Instruments GmbH, Overview All Products, downloaded from the internet at https://www.native-instruments.com/en/catalog/?searching=traktor on Jan. 27, 2023 (11 pgs).

Website Information, Steinberg Media Technologies GmbH, "Cubase", downloaded from the internet at https://www.steinberg.net/cubase/ on Jan. 27, 2023 (13 pgs).

Website Information, Ableton, "What is Live?", downloaded from the internet at https://www.ableton.com/en/live/what-is-live/ on Jan. 27, 2023 (27 pgs).

Website Information, Hornet Plugins, "HoRNet SongKey MK4", downloaded from the internet at https://www.hornetplugins.com/plugins/hornet-songkey-mk4/ on Jan. 27, 2023 (8 pgs).

Website Information, Avid Technology, Inc., "Pro Tools. Music Production.", downloaded from the internet at https://www.avid.com/pro-tools on Jan. 27, 2023 (14 pgs).

Website Information, Waves Audio Ltd, "WLM Plus Loudness Meter. How to Set Loudness Levels for Streaming.", downloaded from the internet at https://www.waves.com/plugins/wlm-loudness-meter#how-to-set-loudness-levels-for-streaming-wlm on Jan. 27, 2023 (3 pgs).

Website Information, Waves Audio Ltd, "Loudness Metering Explained.", downloaded from the internet at https://www.waves.com/loudness-metering-explained on Jan. 27, 2023 (5 pgs).

Website Information, Dolby Professional, "Dolby Atmos Personalized Rendering (beta)", downloaded from the internet at https://professionaldolby.com/phrtf on Jan. 27, 2023 (14 pgs).

Website Information, Dear Reality, "dearVR PRO", downloaded from the internet at https://www.dear-reality.com/products/dearvr-pro#:~:text=dearVR%20PRO%20is%20the%20all,output%20formats%20up%20to%209.1. on Jan. 27, 2023 (9 pgs).

* cited by examiner

AUDIO INFUSION SYSTEM AND METHOD

FIELD OF THE INVENTION

The present invention relates generally to audio systems and methods and, more particularly, to systems and methods for digitally processing audio recordings to provide a measurable enhanced effect for end users.

DESCRIPTION OF RELATED ART

Different types of sounds may be used to entrain the human brain to reach a certain mental state. For example, when two tones having slightly different frequencies are played in the left and right ears simultaneously, the human brain perceives the creation of a third tone having a frequency equivalent to the difference between the two tones being played. This auditory illusion is called a binaural beat and, depending on its frequency, may be used to reduce stress and anxiety, increase focus and concentration, improve sleep quality, or provide other benefits. In some cases, an individual may choose to listen to binaural beats with music in order to improve the listening experience. However, the binaural beats are simply played as background to the music (or vice-versa)—i.e., the music material itself is not used for purposes of brainwave entrainment. Thus, there remains a need in the art for an improved method of delivering sounds with neuropsychological impact that overcomes drawbacks associated with existing methods and/or that offers other advantages compared to existing methods.

SUMMARY OF THE INVENTION

The present invention is directed to methods and systems for infusing sounds into source audio tracks without disruption in the musical quality or perceived composition in order to provide desired psychological, neurological and/or physiological outcomes.

In one embodiment, a source audio track is separated into a plurality of audio tracks, such as multiple music stems, and each of the separated audio tracks is individually processed to generate a binaural beat track. Each binaural beat track is generated from an audio track by (a) transcribing the audio track to provide a transcription that includes an estimated fundamental frequency and/or an estimated amplitude envelope for each of a plurality of notes and (b) using the transcription to generate the binaural beat track. This embodiment provides multiple binaural beat tracks-one for each of the separated audio tracks-which provides multiple layers of stimulation. Because the binaural beat tracks are derived from the separated audio tracks, the perception of certain instruments and/or vocals in the audio tracks may be enhanced. Further, the delivery of multilayered binaural beats that are dynamically matched to the source audio track results in a polyphonic binaural beat experience that implements frequencies compatible with the tonal center of the source audio track without distorting the acoustic experience.

While existing methods of binaural beat implementation typically involve the delivery of one drone tone frequency in each of the left and right speaker channels, drawing from a limited frequency spectrum, the binaural beat generation method of the present invention draws from a series of pitches that are harmonically and melodically compatible with the source audio track. Since it is an established hypothesis that individuals respond to certain binaural "carrier" and "offset" frequencies with greater success than other frequencies on a subjective level, this method increases the probability of successful brainwave entrainment via the greater number and variety of source frequencies creating the binaural beat effect.

In another embodiment, the source audio track is processed to generate one or more spatialized tracks. Each spatialized track is generated from one or more spatialization trajectories that are derived from certain audio feature(s) of the source audio track (e.g., tempo, musical event density, harmonic mode, loudness, percussiveness, etc.) and a target end-state effect. Each spatialized track is configured so that the sound source is perceived to move in time with the music—i.e., each spatialized track provides tempo-based spatialization. Spatialization creates sustained attention by directing the focus to a moving sound source that enhances the neurological effect. Furthermore, tracking a moving sound source activates spatial awareness.

In another embodiment, the source audio track is processed to generate both binaural beat tracks and one or more spatialized tracks, as described above. Additional tracks may also be generated, such as one or more infrasonic tracks, ultrasonic tracks, enhanced bass tracks, and/or subharmonic tracks. The various tracks may be played simultaneously or mixed for delivery of a single enhanced audio track to an end user device. It should be noted that the binaural beat stimulation and tempo-based spatialization are additive to the infrasonic and ultrasonic track synthesis and enhanced bass and subharmonic processing techniques so as to provide synergies in driving neurological responses.

Various embodiments of the present invention are described in detail below, or will be apparent to one skilled in the art based on the disclosure provided herein, or may be learned from the practice of the invention. It should be understood that the above summary of the invention is not intended to identify key features or essential components of the embodiments of the present invention, nor is it intended to be used as an aid in determining the scope of the claimed subject matter as set forth below.

BRIEF DESCRIPTION OF FIGURES

Various exemplary embodiments of the present invention are described in detail below with reference to the attached drawing figures, wherein.

DETAILED DESCRIPTION

Figure 1:
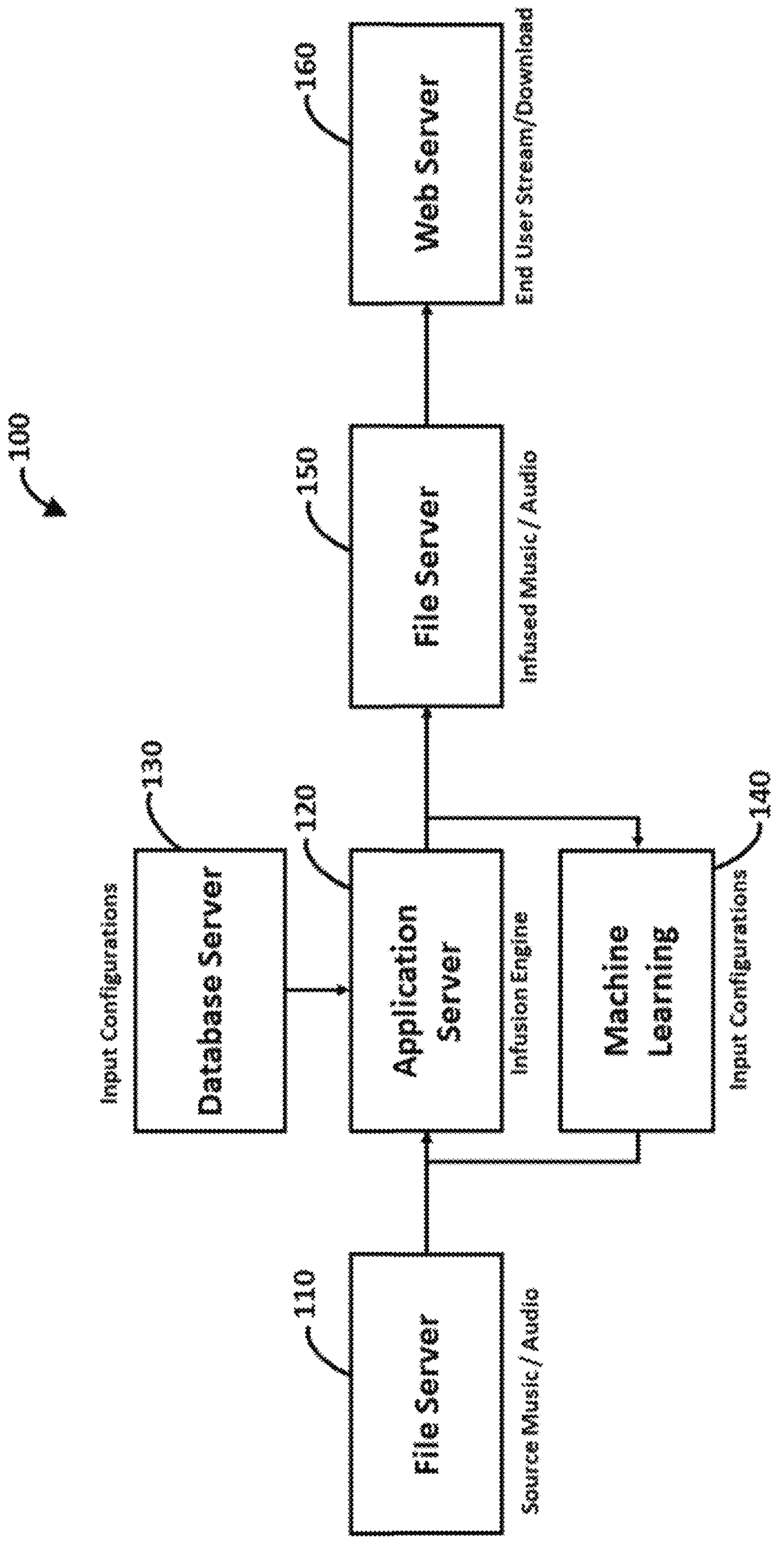
FIG. 1 is a block diagram of one embodiment of an audio infusion system that may be used to create enhanced audio tracks in accordance with the present invention.

The present invention is directed to methods and systems for infusing sounds into source audio tracks in order to provide desired psychological, neurological and/or physiological outcomes. While the invention will be described in detail below with reference to various exemplary embodiments, it should be understood that the invention is not limited to the specific configurations or methodologies of these embodiments. In addition, although the exemplary embodiments are described as embodying several different inventive features, one skilled in the art will appreciate that any one of these features could be implemented without the others in accordance with the present invention.

In the present disclosure, references to "one embodiment," "an embodiment," "an exemplary embodiment," or "embodiments" mean that the feature or features being described are included in at least one embodiment of the invention. Separate references to "one embodiment," "an embodiment," "an exemplary embodiment," or "embodiments" in this disclosure do not necessarily refer to the same embodiment and are also not mutually exclusive unless so stated and/or except as will be readily apparent to one skilled in the art from the description. For example, a feature, structure, function, etc. described in one embodiment may also be included in other embodiments, but is not necessarily included. Thus, the present invention can include a variety of combinations and/or integrations of the embodiments described herein.

In general terms, the methods of the present invention include various digital signal processing steps that are performed to infuse sounds into a source audio track and thereby produce an enhanced audio track that is configured to achieve a desired psychological, neurological and/or physiological outcome.

The source audio track may comprise any type of audio recording that includes vocals, instrumental music, and/or other types of sounds-including one channel music tracks (mono), two-channel music tracks (stereo), or multiple-channel music tracks (surround sound, spatial audio, etc.). In some embodiments, the source audio track is a stereo music track that has been professionally mixed and mastered. Of course, the present invention is not limited to the enhancement of commercial audio recordings, i.e., any type of audio recording may be enhanced in accordance with the teachings described herein.

Various types of sounds may be infused into the source audio track, such as binaural beats, tempo-based spatialization, infrasonic signals, ultrasonic signals, enhanced bass, subharmonics, and the like. It should be understood that any combination of these sounds may be used in a particular implementation, including (a) binaural beats only, (b) tempo-based spatialization only, (c) binaural beats and tempo-based spatialization, (d) binaural beats and infrasonic and/or ultrasonic signals, (e) tempo-based spatialization and infrasonic and/or ultrasonic signals; (f) binaural beats, tempo-based spatialization, and infrasonic and/or ultrasonic signals, and (g) any of the foregoing combinations with enhanced bass and/or subharmonics. Of course, other sound combinations and additional sounds may also be used within the scope of the present invention.

Sounds may be infused into the source audio track in different ways. One infusion method involves processing the source audio track in such a manner as to produce one or more audio tracks that are derived from the source audio track. Examples of audio tracks that may be produced using this infusion method include binaural beat track(s), spatialized track(s), enhanced bass track(s) and/or subharmonic track(s). Another infusion method involves generating one or more synthetic audio tracks. Examples of audio tracks that may be produced using this infusion method include infrasonic track(s) and/or ultrasonic track(s). Of course, both of the above infusion methods may be used, and all of the audio tracks may optionally be mixed to provide a single enhanced audio track. Thus, the "infusion" of sound into a source audio track as used herein means processing the source audio track to produce one or more audio tracks that are derived from the source audio track and/or generating one or more synthetic audio tracks, and optionally mixing the audio tracks to provide a single enhanced audio track-all for the purpose of obtaining a desired psychological, neurological and/or physiological outcome.

An enhanced audio track with the infused sounds may be delivered to an end user device via any known delivery method, such as streaming or downloading of an audio file to an end user device. The enhanced audio track may comprise a mixed audio track that may be played through stereo headphones, earphones, earbuds, one or more speakers, and the like. Alternatively, the enhanced audio track may comprise individual audio tracks that may be played simultaneously through multiple speakers or multiple headphone drivers.

The methods of the present invention may be performed in conjunction with additional pre-processing steps that occur before the steps described above. For example, a healthcare professional or other operator may determine the settings of an input configuration that is used to produce the infused sound. These settings may be chosen so that the enhanced audio track provides a desired psychological, neurological and/or physiological outcome and, in that respect, the settings will vary between different end users. As another example, the source audio track may be separated from other sound elements prior to the steps described above—e.g., a movie track may include music, speech, and/or sound effects, wherein the music is separated from the speech and sound effects for enhancement as described herein. Other pre-processing steps will be apparent to one skilled in the art.

The methods of the present invention may also be performed in conjunction with additional post-processing steps that occur after the steps described above. For example, the enhanced audio track may be delivered to an end user via a production speaker system that is used for health or medical management. The end user's response to the enhanced audio track may then be measured for effectiveness by a healthcare professional. Other post-processing steps will be apparent to one skilled in the art.

Referring to FIG. 1, one embodiment of an audio infusion system that may be used to create enhanced audio tracks in accordance with the present invention is shown generally as reference number 100. System 100 includes a file server 110 for storing source audio files, an application server 120 for executing a sound infusion application, a database server 130 for storing input configurations that have been manually entered by an operator, a machine learning server 140 for storing input configurations that have been generated through machine learning, a file server 150 for storing enhanced audio files, and a web server 160 for providing access to the enhanced audio files.

File server 110 may comprise any suitable computer hardware and software known in the art that is configured for the storage of source audio files that are available for enhancement by application server 120. The source audio files may be provided in any desired audio format. Examples of common audio formats include Advanced Audio Coding (AAC), Free Lossless Audio Codec (FLAC), Windows Media Video (WMV), Waveform Audio File Format (WAV), MPEG-1 Audio Layer 3 (MP3), and Pulse-Code Modulation (PCM). Of course, other audio formats known in the art may also be used.

Application server 120 may comprise any suitable computer hardware and software known in the art that is configured to receive a source audio file from file server 110, receive an input configuration from database server 130 and/or machine learning server 140, execute a sound infusion application to infuse sound into a source audio track in order to produce an enhanced audio track, and store an enhanced audio file on file server 150. The steps performed by the sound infusion application will be described in greater detail below in connection with FIG. 3-7.

Database server 130 may comprise any suitable computer hardware and software known in the art that is configured to maintain a database for storing a plurality of input configurations that have been manually entered by an operator. The data elements for each input configuration may include a variety of different types of settings, such as: (a) the frequency of binaural beats (in Hz); (b) the volume of binaural beats (in Loudness Units Full Scale (LUFS) units); (c) the frequency of infrasound (in Hz); (d) the volume of infrasound (in LUFS units); (e) the frequency of ultrasound (in Hz); (f) the volume of ultrasound (in LUFS units); (g) the subharmonic volume (in LUFS units); (h) the bass intensity (in LUFS units); and (i) the bass volume (in LUFS units). Of course, other settings may also be stored in database 130 in accordance with the invention. In some embodiments, the operator is prompted to enter values for the settings via a configuration file, although any data input method known in the art may be used.

Machine learning server 140 may comprise any suitable computer hardware and software known in the art that is configured to maintain and provide a set of machine learning models that are used to generate input configurations. It should be understood that any type of machine learning approach may be used, such as a recommendation engine that uses supervised learning, reinforcement learning, and the like. In general, machine learning server 140 monitors the quality of the output from application server 120 and refines the configuration settings for optimal performance of the audio infusion application.

It should be understood that the input configuration settings for a particular end user or end user group may be manually input by an operator, may be determined through machine learning, or may be a combination of both. The recommended values for these settings may vary between different end users—i.e., the setting values recommended for one individual may be different than the setting values recommended for another individual. These setting values may be determined by experimentation based on various factors, such as the target end-state effect to be achieved, the intended duration of exposure to the enhanced audio track, whether a treatment plan requires the same or different stimuli to be delivered in different sessions, etc. Thus, it can be appreciated that the selection of the setting values enables the generation of an enhanced audio track that has been personalized or customized either manually or by a machine learning process for an end user or end user group.

File server 150 may comprise any suitable computer hardware and software known in the art that is configured for storage of the enhanced audio files generated by application server 120. The enhanced audio files may be provided in any desired audio format, such as AAC, FLAC, WMV, WAV, MP3, and PCM. Of course, other audio formats known in the art may also be used.

Figure 2:
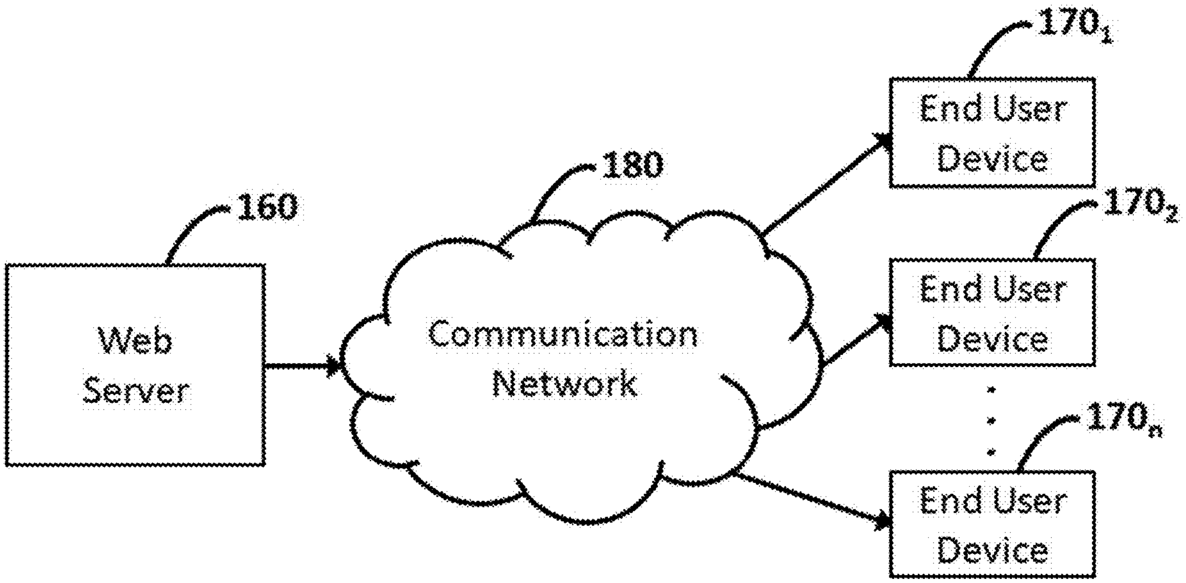
FIG. 2 is a block diagram of one embodiment of an audio delivery system that may be used to deliver the enhanced audio tracks created by the audio infusion system of FIG. 1 to end user devices.

Web server 160 may comprise any suitable computer hardware and software known in the art that is configured to process requests to access (stream, download, etc.) the enhanced audio files stored on file server 150. As shown in FIG. 2, web server 160 may be used to deliver the enhanced audio files to a plurality of end user devices $170_1$-$170_n$ via a communication network 180. Web server 160 may communicate with end user devices $170_1$-$170_n$ via Hypertext Transfer Protocol (HTTP) (e.g., HTTP/1.0, HTTP/1.1 plus, HTTP/2, or HTTP/3), Hypertext Transfer Protocol Secure (HTTPS), or any other network protocol used to distribute data and web content.

End user devices $170_1$-$170_n$ may each comprise a mobile phone, a personal computing tablet, a personal computer, a laptop computer, or any other type of personal computing device that is capable of communication (wireless or wired) with web server 160 via communication network 180. In this embodiment, each of end user devices $170_1$-$170_n$ utilizes an Internet-enabled application (e.g., a web browser or installed application) to communicate with web server 160. It should be understood that end user devices $170_1$-$170_n$ may be used to play the enhanced audio tracks through stereo headphones, earphones, earbuds, one or more speakers, and the like. Alternatively, end user devices $170_1$-$170_n$ may be used to store the enhanced audio tracks in memory (e.g., file copy, thumb drive, etc.) for later playback through another device (e.g., MP3 player, iPod®, etc.).

Communication network 180 may comprise any network or combination of networks capable of facilitating the exchange of data between web server 160 and end user devices $170_1$-$170_n$. In some embodiments, communication network 180 enables communication in accordance with one or more cellular standards, such as the Long-Term Evolution (LTE) standard, the Universal Mobile Telecommunications System (UMTS) standard, and the like. In other embodiments, communication network 220 enables communication in accordance with the IEEE 802.3 protocol (e.g., Ethernet) and/or the IEEE 802.11 protocol (e.g., Wi-Fi). Of course, other types of networks may also be used within the scope of the present invention.

It should be understood that system 100 is an exemplary embodiment and that other embodiments may not include all of the servers shown in FIG. 1 or may include additional servers that are not shown in FIG. 1. In particular, the system may be implemented with any number and combination of application servers, database servers, file servers, web servers, and the like, which are either co-located in the same geographic location or located in different geographic locations and connected to each other via communication network 180. Thus, the system may be implemented with any number and combination of servers that are either co-located or geographically dispersed.

Further, in another embodiment, the sound infusion process that is used to create enhanced audio tracks in accordance with the present invention is performed on a single computing device—e.g., a mobile phone, a personal computing tablet, a personal computer, a laptop computer, or any other type of personal computing device. In this case, the various servers of the system 100 shown in FIG. 1 would not be required. Thus, it can be appreciated that the computer-implemented methods of the present invention may be performed using any type of computing devices known in the art-including any one or combinations of servers, personal computing devices, and the like.

Figure 3:
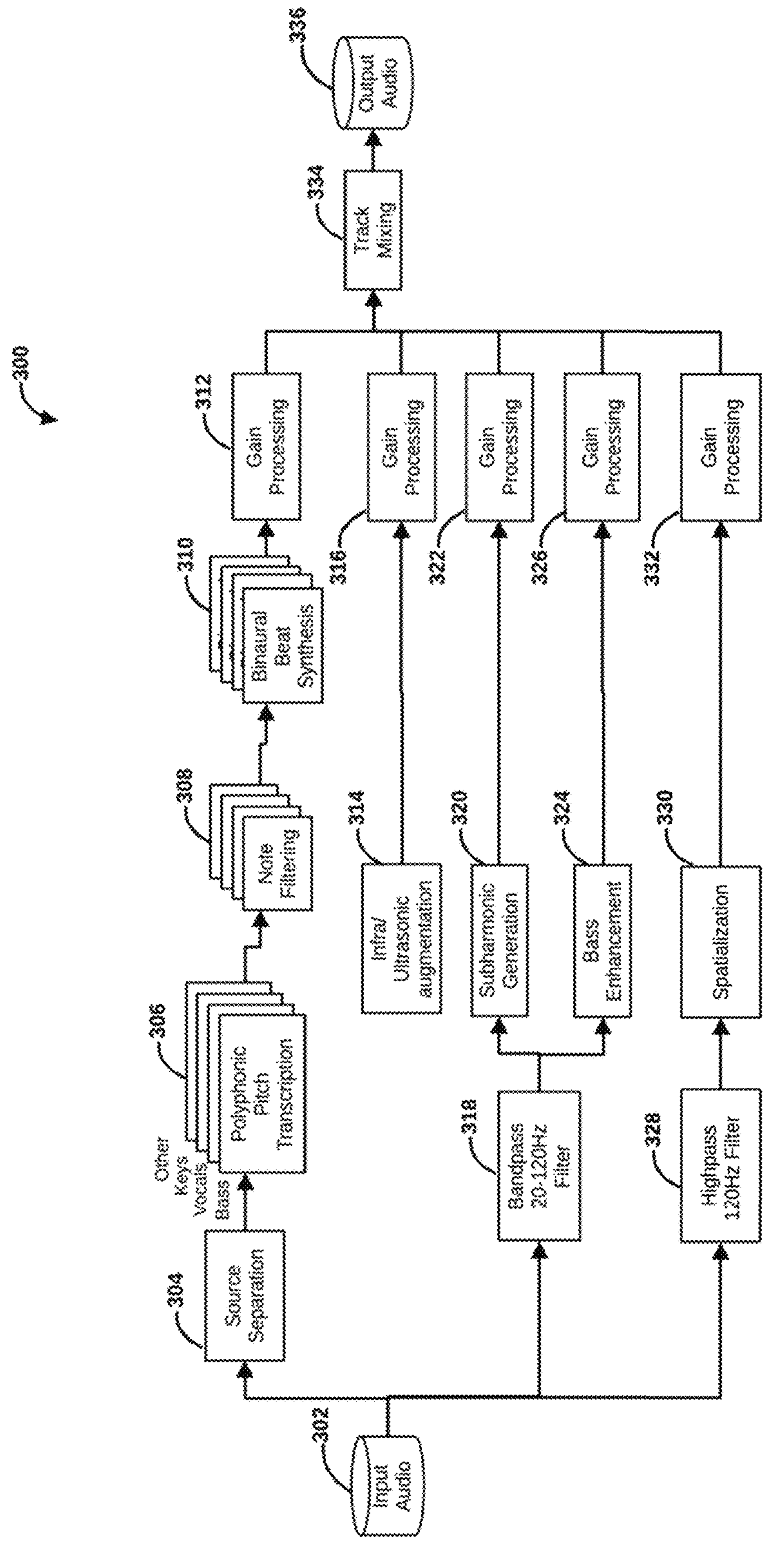
FIG. 3 is a flow diagram of one embodiment of an audio infusion process that may be performed in accordance with the present invention.

Referring to FIG. 3, one embodiment of a sound infusion process that may be performed to create enhanced audio tracks in accordance with the present invention is shown generally as reference number 300. This process may be performed, for example, by application server 120 via the execution of the sound infusion application noted above or by a personal computing device.

In step 302, a source audio track is provided as a digital audio track having one or multiple channels (e.g., mono, stereo, or surround sound). In some embodiments, a compressed or uncompressed audio file (e.g., an audio file provided in an AAC, FLAC, WMV, WAV, MP3, or PCM audio format) is read and decoded into a two-channel digital audio track. For example, application server 120 may read and decode an audio file retrieved from file server 110 to provide the two-channel digital audio track. In other embodiments, analog audio signals are passed through an analog to digital converter to provide the digital audio track.

In step 304, the source audio track is separated into a plurality of audio tracks, commonly termed stem tracks. Each stem track may comprise a vocals track or an instrumental track, which may include either one instrument or a combination of individual instruments that have been originally mixed together to produce the stem track. In the exemplary embodiment shown in FIG. 3, the source audio track is separated into four non-drum stem tracks-a vocals track, a bass track, a keyboards track, and an "other" pitched instruments track. Of course, the number of stem tracks extracted from the source audio track will vary between implementations, and may include, for example, two stem tracks (vocals and instrumental) or five stem tracks (vocals, drums, bass, keyboards, and other pitched instruments). Other stem models are also possible and may be used within the scope of the present invention. The source audio track may be separated into multiple stem tracks using any music source separation tool known in the art, such as Spleeter available from Deezer of Paris, France. In other embodiments, the source audio track is provided as a plurality of individual stem tracks, in which case the audio separation performed in step 304 would not be required.

Once the source audio track is provided as multiple audio tracks, subsequent processing of each of the audio tracks—including transcription (step 306), note filtering (step 308), and binaural beat synthesis (step 310)—can be performed in parallel on a multi-processor computer or across multiple computers. Steps 306, 308 and 310 will be described below in relation to the processing of one stem track; however, it should be understood that these steps will be performed in connection with each of the stem tracks that that are separated in step 304 or provided as individual stem tracks in step 302.

In step 306, each stem track is transcribed to provide information on the various musical notes contained in the stem track. As described below, the transcription may include, for example, an estimated fundamental frequency and/or an estimated amplitude envelope for each musical note in the stem track. If the source audio track comprises two or more channels (e.g., a stereo music track), the channels will be mixed to mono during the transcription process. One skilled in the art will appreciate that this mixing may be performed in different ways, depending on the transcription tool used to perform the transcription. In some cases, the channels are mixed to mono and then a transcription of the single mixed channel is generated. In other cases, each channel is transcribed and then the channel transcriptions are combined. Of course, the channels of the source audio track may alternatively be mixed to mono prior to source separation in step 304, although this approach is generally not as efficient as using the transcription tool to perform the mixing during the transcription process of step 306.

Depending on the source, either monophonic or polyphonic pitch transcription may be used to estimate the fundamental frequency of each musical note in the stem track—e.g., monophonic pitch transcription may be used for inherently monophonic sources and polyphonic pitch transcription may be used for inherently polyphonic sources. For example, in the exemplary embodiment shown in FIG. 3, the vocals and bass stem tracks are monophonically transcribed, while the keyboards and "other" pitched instruments stem tracks are polyphonically transcribed.

Figure 4:
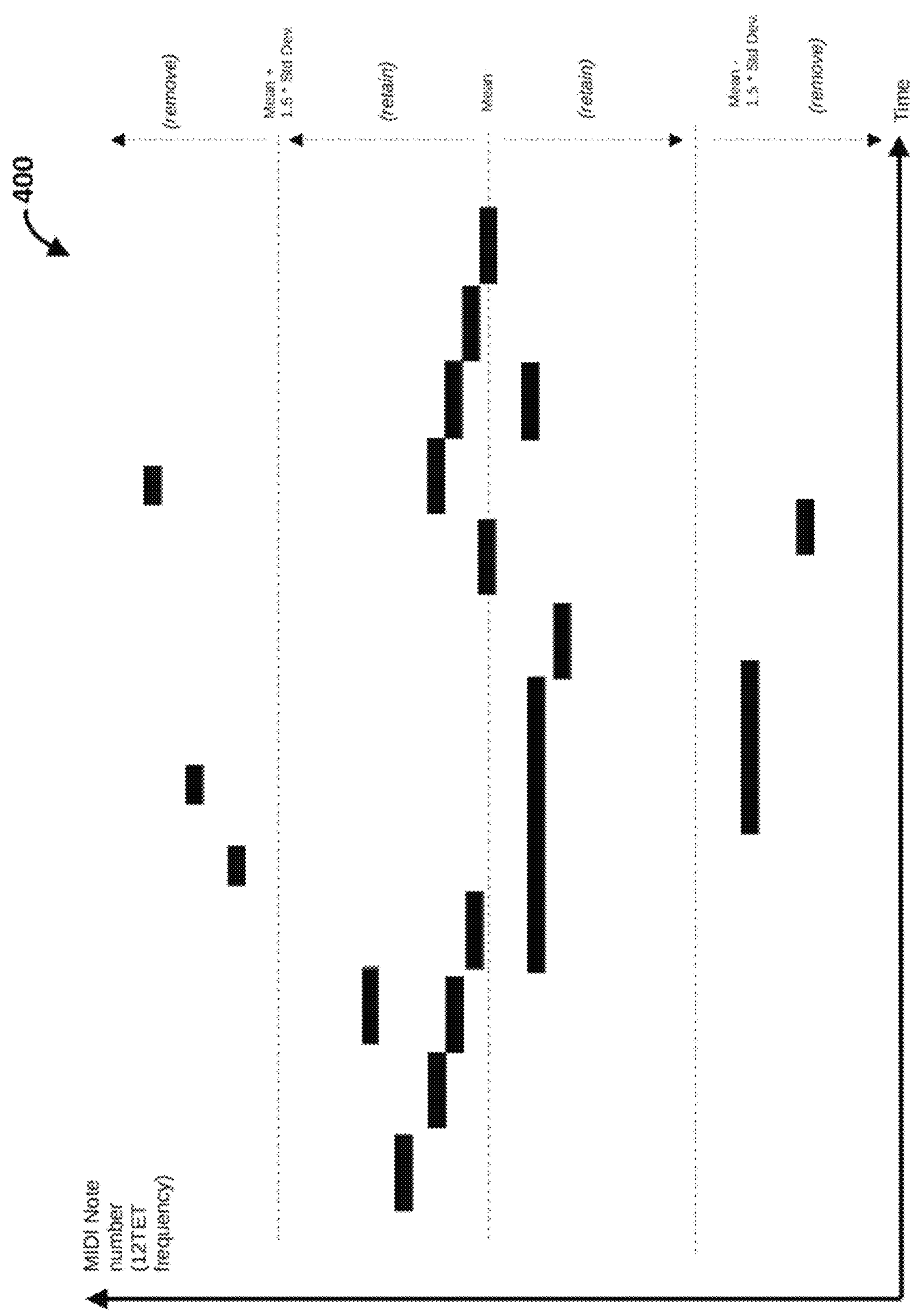
FIG. 4 is an exemplary graph showing the filtering of outlier notes as performed during the "note filtering" step shown in FIG. 3.

The pitch transcription may be represented in different formats. For example, the pitch transcription may be in the form of a musical note event list, such as a standard Musical Instrument Digital Interface (MIDI) file. In this case, each musical note is represented as a MIDI note number (i.e., a pitch quantized into a 12 tone equal-tempered note number) in relation to the time position of such note. An example of a MIDI file is shown in FIG. 4, which will be described below in connection with the note filtering process of step 308. As another example, the pitch transcription may be in the form of a time-frequency matrix (i.e. a spectrogram). In both examples, an estimate of the fundamental frequency of each musical note detected in the stem track is provided.

The transcription may also include an estimated amplitude envelope for each musical note in the stem track. As known in the art, an amplitude envelope for a musical note may be defined by four parameters: an attack time, a decay time, a sustain level, and a release time. During the transcription process, estimated values for these four parameters may be obtained for each musical note in the stem track. Alternatively, it is possible to use a fixed amplitude in which a single amplitude value averaged across time is provided in the settings of the input configuration. In this case, the transcription will only include frequency information—not amplitude information.

Each stem track may be transcribed using any transcription tool known in the art, such as the Melodyne transcription tool available from Celemony Software GmbH of Munich, Germany. Of course, it should be understood that other transcription tools may also be used in accordance with the present invention.

In step 308, the transcribed notes for each stem track are filtered in order to remove any outlier notes caused by errors in the pitch transcription process of step 306. One or more different note filtering methods may be used in accordance with the present invention.

One note filtering method involves identifying the outlier notes based on a statistical analysis of the pitch transcription for the stem track. Specifically, the pitch transcription is analyzed to calculate the mean and standard deviation of the estimated fundamental frequencies of the transcribed notes. Then, the outlier notes are identified as those having an estimated fundamental frequency that is either greater than an upper frequency limit or less than a lower frequency limit. The upper frequency limit has a value comprising the mean plus a first multiplier of the standard deviation, and the lower frequency limit has a value comprising the mean minus a second multiplier of the standard deviation. If the pitch transcription is represented as a MIDI file, the outlier notes are deleted from the musical note event list. On the other hand, if the pitch transcription is represented as a time-frequency matrix, the energy of the outlier notes is set to zero.

The first and second multipliers used to determine the upper and lower frequency limits, respectively, may be the same or different. FIG. 4 shows an example MIDI file in which the first and second multipliers are both set to 1.5. In this case, the musical notes having an estimated fundamental frequency greater than the upper frequency value (i.e., mean+1.5×standard deviation) or lower than the lower frequency value (i.e., mean−1.5×standard deviation) are removed from the musical event note list. Of course, the first and second multipliers may be different in other implementations. Further, the first and second multipliers may be the same for all of the stem tracks or may vary between different stem tracks.

In some embodiments, the first and second multipliers are determined by experimentation using multiple datasets of music selected to represent those typical for processing. Typically, the first and second multipliers will have a value in the range of 1.25 (in cases where more filtering is required) to 2.5 (in cases where less filtering is required). In most cases, the first and second multipliers are pre-set and do not need to be adjusted when processing different music tracks. Of course, in other embodiments, the first and second multipliers may be part of the input configuration and, as such, would be entered by an operator or determined through machine learning.

Another note filtering method involves estimating the musical key of the stem track and then filtering out all transcribed notes with a fundamental frequency falling outside of that musical key. The musical key may be estimated using any key estimation algorithm known in the art, such as those described in C. L. Krumhansl and E. J. Kessler, *Tracing the Dynamic Changes in Perceived Tonal Organization in a Spatial Representation of Musical Keys*, Psychological Review, 89(4):334-368, 1982.

For example, if the musical key of the stem track is estimated to be A major and the pitch transcription process of step 306 generates a note list of (A3, C3, C #3, D3, E3, F3, G #3), the note filtering process of step 308 may filter that note list to (A3, C #3, D3, E3, G #3). In this case, certain notes are filtered out so that the remaining notes match the tonal center of the stem track—e.g., the A3, C #3, D3, E3, and G #3 pitches are compatible with the musical key of A major, while the C3 and F3 pitches are not compatible with the musical key of A major.

The musical key estimation and filtering method may be used by itself or in combination with the statistical analysis method described above. Of course, other note filtering methods known in the art may also be used within the scope of the present invention.

It should be understood that the note filtering methods described above may not be required if the errors in the pitch transcription process of step 306 are sufficiently low so as to fall within acceptable limits. In this regard, step 308 is optional and may not be performed in all implementations.

In step 310, the filtered transcription of each stem track is used to synthesize a corresponding binaural beat track. The binaural beat track is comprised of first and second binaural channels, each of which includes one or more sinusoidal signals that are derived from the transcribed notes in the filtered transcription. Different methods may be used to generate these sinusoidal signals.

In the exemplary embodiment shown in FIG. 3, the time-varying frequencies of the sinusoidal signals provided in the first and second binaural channels are determined by identifying a binaural beat frequency parameter, and then using this parameter in combination with the estimated fundamental frequency and temporal duration of each of the musical notes in the filtered transcription to determine such frequencies.

The binaural beat frequency parameter is included in the input configuration described above (i.e., the frequency of binaural beats (in Hz)), and is representative of a magnitude of frequency deviation from the estimated fundamental frequency of each transcribed note. Specifically, the binaural beat frequency parameter is added to the estimated fundamental frequency to determine the corresponding frequency of a sinusoidal signal provided in the first binaural channel and, conversely, the binaural beat frequency parameter is subtracted from the estimated fundamental frequency to determine the corresponding frequency of a sinusoidal signal provided in the second binaural channel. For example, if the binaural beat frequency parameter is 2 Hz and the estimated fundamental frequency of a transcribed note is 440 Hz, then the corresponding frequencies of the sinusoidal signals provided on the first and second binaural channels are 438 Hz and 442 Hz, respectively. This same approach is used for all transcribed notes. Thus, the binaural effect is synthesized by a low frequency difference between the sinusoidal signals provided on the first and second binaural channels.

For stems that are processed polyphonically, the filtered transcription may include multiple transcribed notes that occur at the same time—e.g., the "other" pitched instruments stem track may include musical notes associated with two or more instruments. The estimated fundamental frequencies of these transcribed notes are used to synthesize multiple (i.e., simultaneously sounding) sinusoidal signals. For stems that are processed monophonically, only one sinusoidal signal will occur at a time. Thus, it can be appreciated that each of the first and second binaural tracks may include one to multiple sinusoidal signals within the scope of the present invention.

In the exemplary embodiment shown in FIG. 3, the amplitude of the sinusoidal signals provided in the first and second binaural channels may be determined in different ways. In some embodiments, the estimated amplitude envelopes of the musical notes in the filtered transcription are used to control the relative amplitudes of the sinusoidal signals that are synthesized. For example, if the transcribed amplitude varies over time, then the amplitude of the binaural sinusoidal signals will also vary over time. In other embodiments, a binary beat volume parameter included in the input configuration described above (which defines a single amplitude value averaged across time) is used to determine the amplitude of the binaural sinusoidal signals. It can be appreciated that this approach provides a simplified way to determine the amplitude of the sinusoidal signals that does not require transcription of the estimated amplitude envelopes of the musical notes.

In step 312, the gains of the binaural beat tracks (i.e., one binaural beat track corresponding to each music stem track) are adjusted using the gain setting process described below in connection with FIG. 7. Alternatively, any gain adjustment method known in the art, including use of a fixed gain, may be used to set the gains of the binaural beat tracks.

In step 314, one or more infrasonic tracks and/or one or more ultrasonic tracks are synthesized, each of which comprises a sinusoidal signal having a frequency and an amplitude that are fixed across the track. Unlike the other tracks described herein, the infrasonic and/or ultrasonic tracks are not derived from the source audio track.

For each infrasonic track, the frequency of the sinusoidal signal is determined from an infrasound frequency parameter included in the input configuration described above (i.e., the frequency of infrasound (in Hz)) and the amplitude of the sinusoidal signal is determined from an infrasound volume parameter included in the input configuration described above (i.e., the volume of infrasound (in LUFS units)). Typically, the frequency of the infrasound has a value in the range of 0.25 Hz to 20 Hz. The selected frequency is chosen to be complementary to the frequencies of the source audio track, either by manual selection, or by use of machine learning. The frequency chosen for each infrasonic track can be selected as complementary by combined reference to the neurological and physiological sensitivity of the listener to probe frequencies, and by reference to subharmonics of identified prominent frequencies in the source audio track. The balance between these contributions is determined either by manual selection, or by use of machine learning.

For each ultrasonic track, the frequency of the sinusoidal signal is determined from an ultrasound frequency parameter included in the input configuration described above (i.e., the frequency of ultrasound (in Hz)) and the amplitude of the sinusoidal signal is determined from an ultrasound volume parameter included in the input configuration described above (i.e., the volume of ultrasound (in LUFS units)). Typically, the frequency of the ultrasound has a value in the range of 20 kHz to the Nyquist frequency (one-half the audio sample rate). The selected frequency is chosen to be complementary to the frequencies of the source audio track, either by manual selection, or by use of machine learning. The frequency chosen for each ultrasonic track can be selected as complementary by combined reference to the neurological and physiological sensitivity of the listener to probe frequencies, and by reference to high frequency harmonics of identified prominent frequencies in the source audio track. The balance between these contributions is determined either by manual selection, or by use of machine learning.

It should be understood that the number of infrasonic tracks and/or ultrasonic tracks will vary between different contexts—i.e., some implementations will synthesize one or more infrasonic tracks, some implementations will synthesize one or more ultrasonic tracks, and some implementations will synthesize a combination of one or more infrasonic tracks and one or more ultrasonic tracks. It can be appreciated that the input configuration will include a frequency parameter and a volume parameter for each of these tracks.

In step 316, the gains of the one or more infrasonic tracks and/or the one or more ultrasonic tracks are adjusted using the gain setting process described below in connection with FIG. 7. Alternatively, any gain adjustment method known in the art, including use of a fixed gain, may be used to set the gains of the infrasonic and/or ultrasonic tracks.

In step 318, the source audio track is filtered to remove non-bass frequencies. In the exemplary embodiment shown in FIG. 3, a band pass filter having a passband of 20 Hz to 120 Hz is used to remove the non-bass frequencies. Of course, other methods may alternatively be used, e.g., source audio separation may be used to remove the non-bass instruments. Thus, the bass frequency content of the source audio track is provided for processing in steps 320 and 324.

In step 320, a subharmonic track is generated by synthesizing subharmonics of the bass frequency content of the music audio using a subharmonic generator. Any subharmonic generator known in the art may be used to create subharmonic frequencies below the fundamental frequencies of the bass frequency content, typically using harmonic subdivision methods. The subharmonic track may comprise non-sinusoidal signals derived from a combination of frequencies drawn from the source audio track using spectral analysis, such as a fast Fourier transform (FFT). The subharmonic volume (in LUFS units) provided in the input configuration described above is used to set an amplitude for the subharmonic track that is at a desired balance with the other musical elements within the final mixed track (e.g., not too overpowering in intensity, not inaudible, etc.).

In step 322, the gain of the subharmonic track is adjusted using the gain setting process described below in connection with FIG. 7. Alternatively, any gain adjustment method known in the art, including use of a fixed gain, may be used to set the gain of the subharmonic track.

In step 324, an enhanced bass track is generated by enhancing the bass frequency content of the music audio using the process described in U.S. Pat. No. 5,930,373, which is incorporated herein by reference. In this process, a bass intensity parameter included in the input configuration described above (i.e., the bass intensity (in LUFS units)) is used to determine the degree of bass enhancement of the processed track, while a bass volume parameter included in the input configuration described above (i.e., the bass volume (in LUFS units)) is used to determine the loudness of the processed track. One skilled in the art will appreciate that bass enhancements are desired for maximum effect (e.g., power, warmth, clarity, etc.).

In step 326, the gain of the enhanced bass track is adjusted using the gain setting process described below in connection with FIG. 7. Alternatively, any gain adjustment method known in the art, including use of a fixed gain, may be used to set the gain of the enhanced bass track.

In step 328, the source audio track is filtered to remove bass frequencies. In the exemplary embodiment shown in FIG. 3, a high pass filter is used to remove frequencies below 120 Hz. Of course, other methods may alternatively be used, e.g., source audio separation may be used to remove the bass instruments. A low pass filter may also be used to remove frequencies above 20 kHz in order to reduce high frequencies from sibilant sounds (e.g., cymbals) that may create audible artifacts from spatialization processing. Then, in step 330, a spatialized track is generated by spatializing the non-bass frequency content of the source audio track.

In step 332, the gain of the spatialized track is adjusted using the gain setting process described below in connection with FIG. 7. Alternatively, any gain adjustment method known in the art, including use of a fixed gain, may be used to set the gain of the spatialized track.

In step 334, the various audio tracks described above—i.e., binaural beat tracks, infrasonic and/or ultrasonic tracks, subharmonic track, enhanced bass track, and spatialized track—are mixed to produce an enhanced audio track. In the exemplary embodiment, the mixing is performed by summation and averaging to produce a two-channel digital audio track. Then, in step 336, the enhanced audio track is stored as a compressed or uncompressed audio file (e.g., an audio file provided in an AAC, FLAC, WMV, WAV, MP3, or PCM audio format). For example, with reference to FIG. 1, application server 120 may store the audio file in file server 150. The audio file may then be streamed or downloaded to an end user device for playback through stereo headphones, earphones, earbuds, one or more speakers, and the like. It is also possible to produce individual enhanced tracks (as opposed to a mixed track), wherein the individual enhanced tracks may be played simultaneously by the end user.

Figure 8A:
FIGS. 8A-8K depict example audio tracks at various stages of the audio infusion process shown in FIG. 3, including: a source audio track (FIG. 8A); individual tracks after the "gain processing" steps, including four binaural beat tracks (FIGS. 8B-8E), an infrasonic track (FIG. 8F), an ultrasonic track (FIG. 8G), a subharmonic track (FIG. 8H), an enhanced bass track (FIG. 8I), and a spatialized track (FIG. 8J); and a final enhanced audio track (FIG. 8K).
Figure 8B:
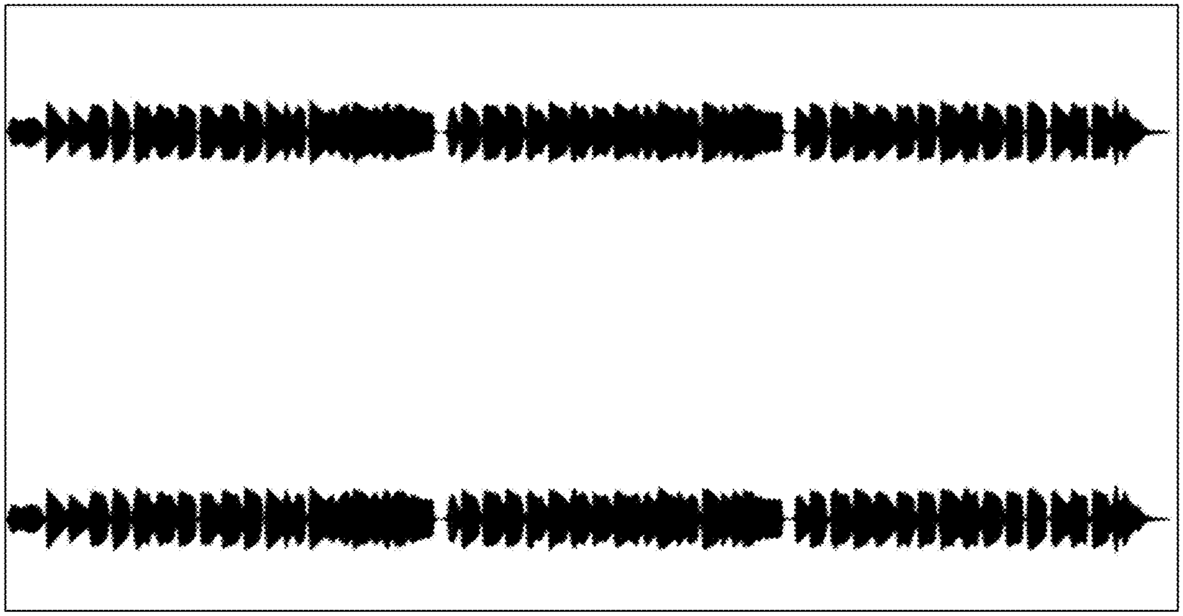
Figure 8C:
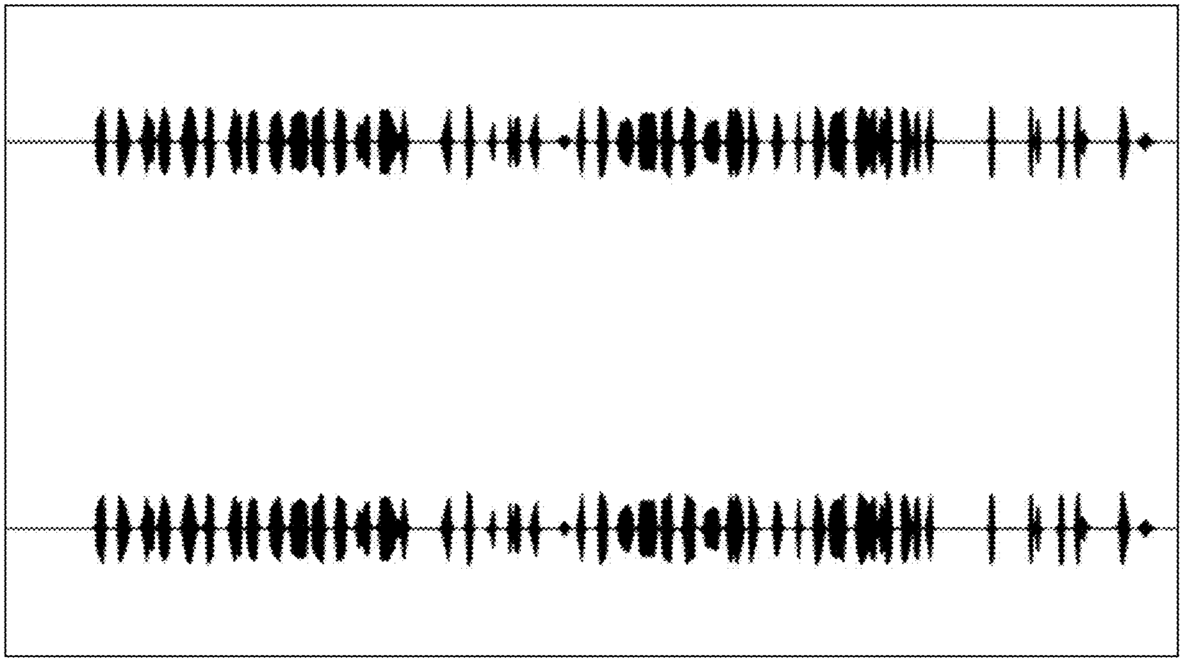
Figure 8D:
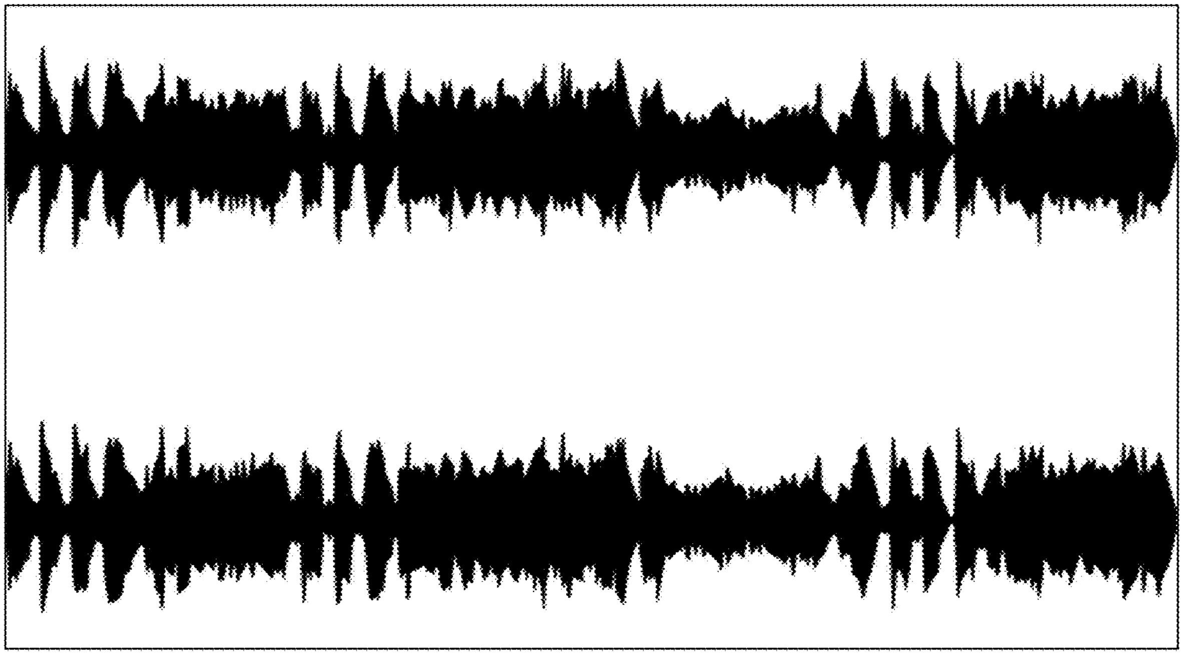
Figure 8E:
Figure 8F:
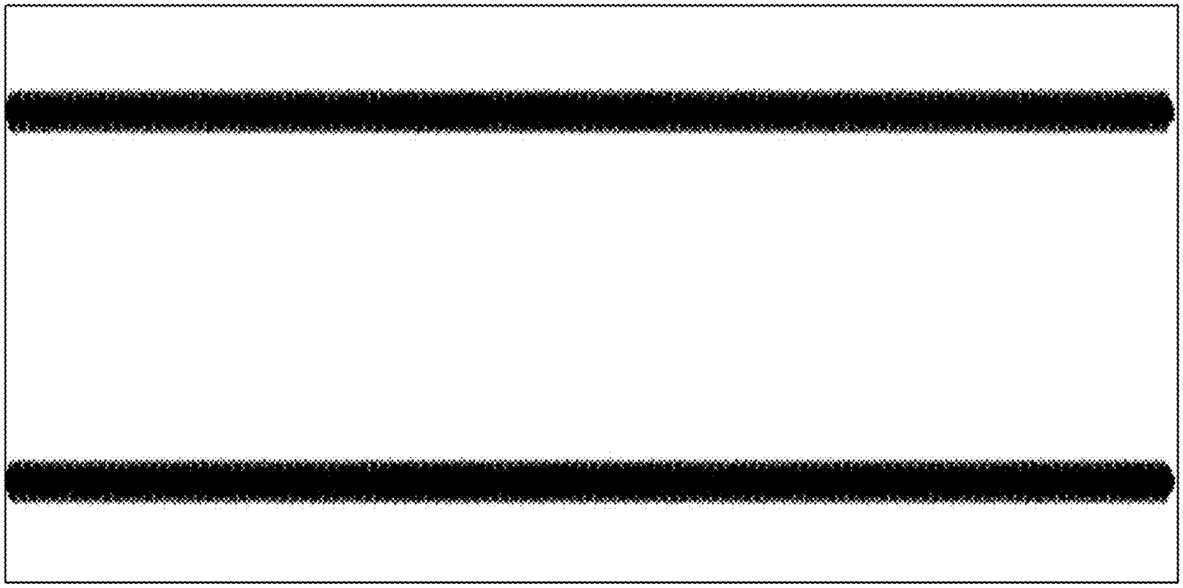
Figure 8G:
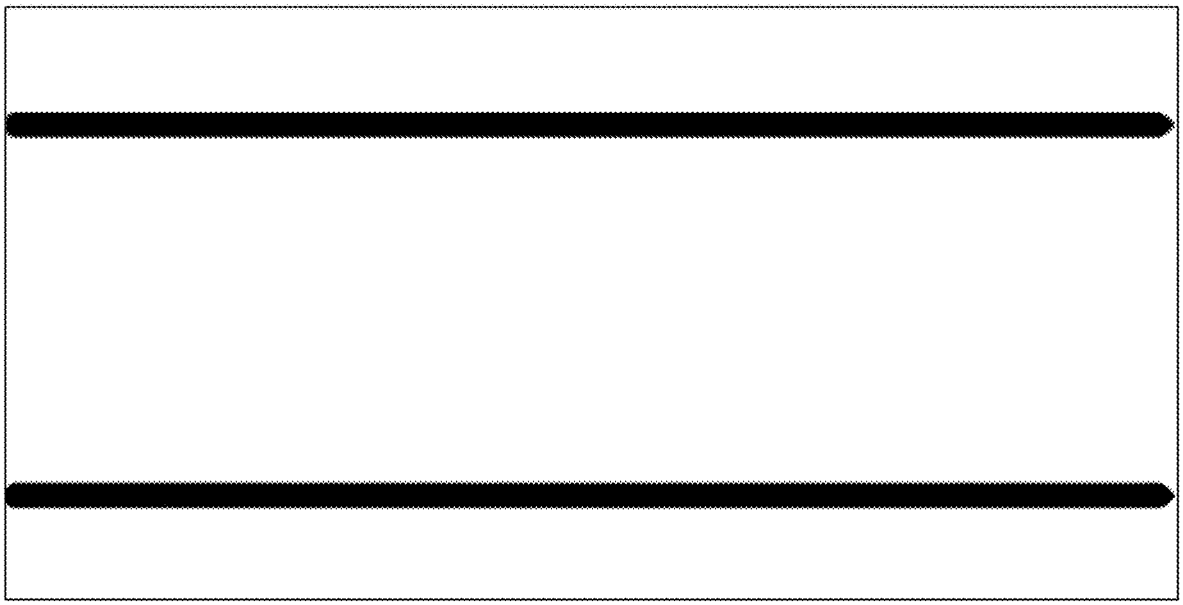
Figure 8H:
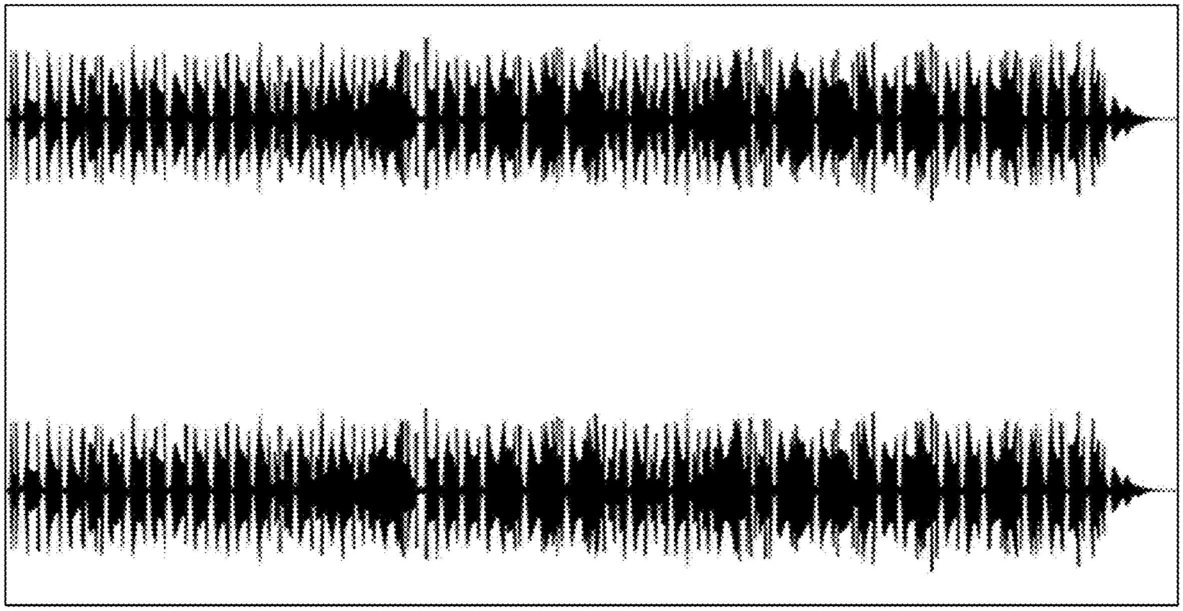
Figure 8I:
Figure 8J:
Figure 8K:
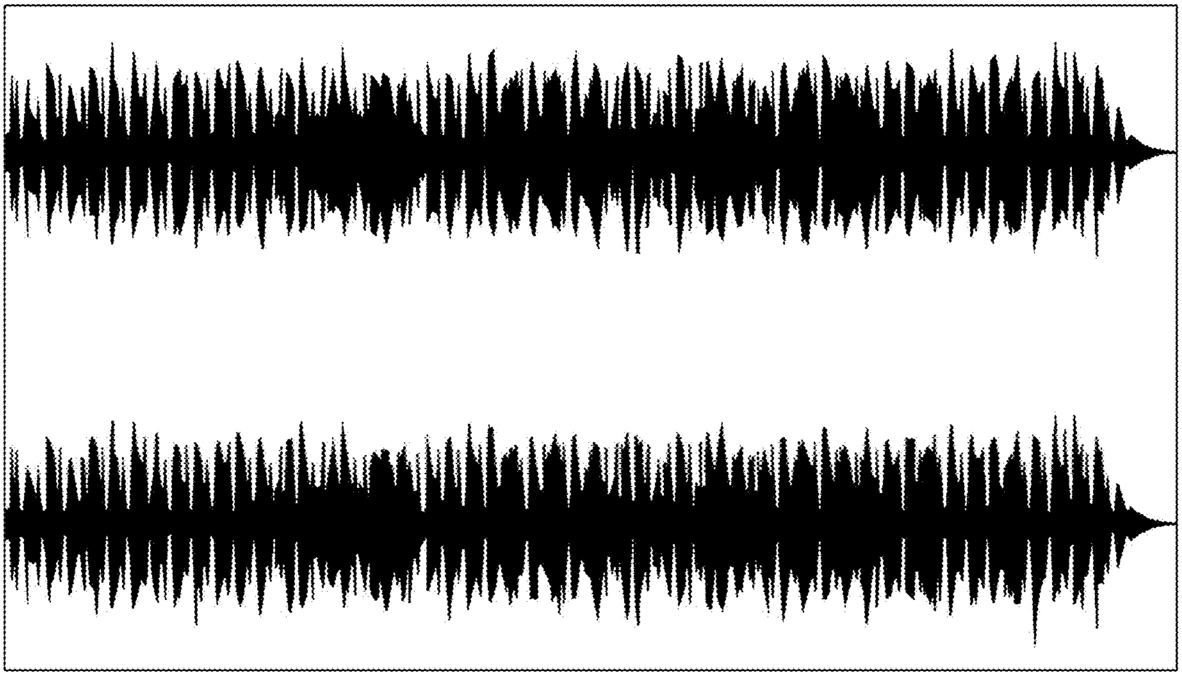

FIGS. 8A-8K depict example audio tracks at various stages of the sound infusion process shown in FIG. 3. Specifically, FIG. 8A depicts a source audio track obtained in step 302; FIG. 8B depicts a binaural beat track corresponding to the bass stem track after gain adjustment in step 312; FIG. 8C depicts a binaural beat track corresponding to the vocals stem track after gain adjustment in step 312; FIG. 8D depicts a binaural beat track corresponding to the keyboards stem track after gain adjustment in step 312; FIG. 8E depicts a binaural beat track corresponding to the "other" pitched instruments stem track after gain adjustment in step 312; FIG. 8F depicts an infrasonic track after gain adjustment in step 316; FIG. 8G depicts an ultrasonic track after gain adjustment in step 316; FIG. 8H depicts a subharmonic track after gain adjustment in step 322; FIG. 8I depicts an enhanced bass track after gain adjustment in step 326; FIG. 8J depicts a spatialized track after gain adjustment in step 332; and FIG. 8K depicts a final enhanced audio track after mixing in step 334.

Figure 5:
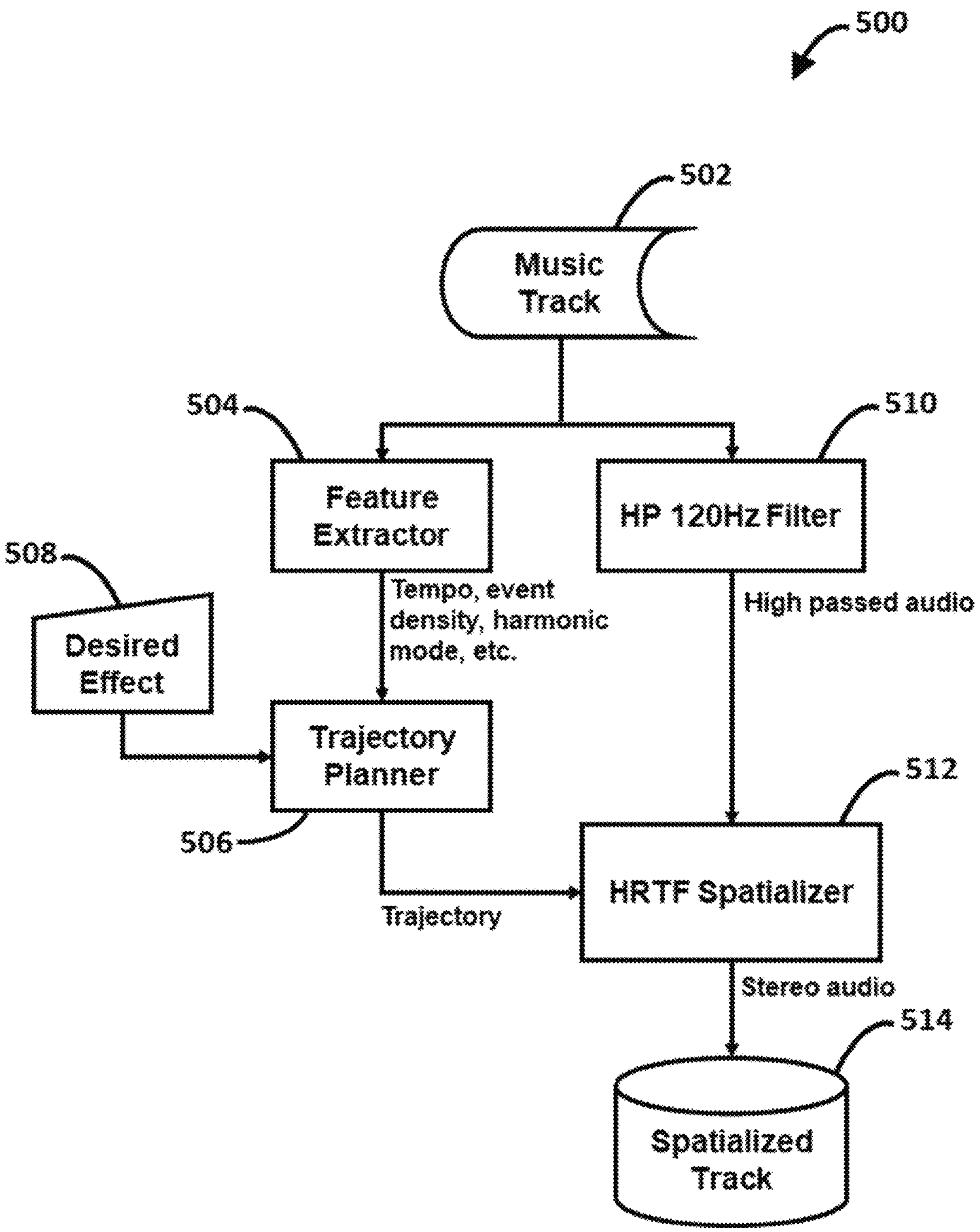
FIG. 5 is a flow diagram of an exemplary process for generating a spatialization track.

Referring to FIG. 5, one embodiment of a process for generating a spatialization track in accordance with the present invention is shown generally as reference number 500. This process may be performed, for example, as steps 328 and 330 of the method shown in FIG. 3.

In step 502, the source audio track is obtained. In step 504, one or more features are extracted from the source audio track, such as (a) a tempo of the source audio track (in beats per minute (BPM)), (b) a musical event density of the source audio track (in events per second), (c) a harmonic mode of the source audio track (major, minor, etc.), (d) a loudness of the source audio track (in LUFS units), and/or (e) a percussiveness of the source audio track (using leading edge transient detection). These features may be extracted using any feature extraction algorithms known in the art, and are then fed to a trajectory planner for processing in step 506, described below.

Examples of tempo estimation software that may be used to estimate the tempo of the source audio track include the Traktor software available from Native Instruments GmbH of Berlin, Germany, the Cubase software available from Steinberg Media Technologies GmbH of Hamburg, Germany, the Ableton Live software available from Ableton AG of Berlin, Germany, and the Hornet Songkey MK4 software available from Hornet SRL of Italy. The tempo may also be estimated using the approaches described in D. Bogdanov et al., *Essentia: An audio Analysis Library for Music Information Retrieval,* 14th Conference of the International Society for Music Information Retrieval (ISMIR), pages 493-498, 2013.

The musical event density of the source audio track may be estimated using the approaches described in D. Bogdanov et al., *Essentia: An audio Analysis Library for Music Information Retrieval,* 14th Conference of the International Society for Music Information Retrieval (ISMIR), pages 493-498, 2013.

Examples of harmonic mode estimation software that may be used to estimate the harmonic mode of the source audio track include the Traktor software available from Native Instruments GmbH of Berlin, Germany, the Cubase software available from Steinberg Media Technologies GmbH of Hamburg, Germany, the Ableton Live software available from Ableton AG of Berlin, Germany, the Hornet Songkey MK4 software available from Hornet SRL of Italy, and the Pro Tools software available from Avid Technology, Inc. of Burlington, Massachusetts.

An example of loudness estimation software that may be used to estimate the loudness of the source audio track includes the WLM Loudness Meter software available from Waves Audio Ltd. of Tel Aviv, Israel.

The percussiveness of the source audio track may be estimated using the approaches described in F. Gouyon et al., *Evaluating Rhythmic Descriptors for Musical Genre Classification*, Proceedings of the AES 25th International Conference, pages 196-204, 2004.

In step 508, an end-state effect intended to be induced in the end user is obtained. Examples of end-state effects include, but are not limited to, calm-grounded-controlled, motivated-inspired-energized, relaxed-tranquil-sleepy, undistracted-meditative-focused, comforted-relieved-soothed, recovered-restored, and driven-enhanced-in flow state. The end-state effect is then fed to the trajectory planner for processing in step 506, described below.

In step 506, the trajectory planner generates a spatialization trajectory that is derived from the audio feature(s) extracted from the source audio track and the target end-state effect. The spatialization trajectory may be a two-dimensional (2D) trajectory or a three-dimensional (3D) trajectory, depending on the implementation and desired effect. In particular, a 2D trajectory enables control of the perceived distance and lateral excursion of a sound; in a 3D trajectory, it is also possible to control the elevation of the trajectory. A number of different approaches may be used to generate the spatialization trajectory.

In some embodiments, the audio feature(s) extracted from the source audio track and the target end-state effect are used to index into a preset spatialization trajectory. Examples of four preset spatialization trajectories—each of which is associated with a tempo of the source audio track and a target end-state effect—are provided in Table 1 below:

TABLE 1

| Preset Spatialization Trajectory | Tempo | End-State Effect |
|---|---|---|
| #1 | 120-140 BPM | Effect A |
| #2 | 90-120 BPM | Effect A |
| #3 | Any | Effect B |
| #4 | 80-110 BPM | Effect C |

It should be understood that the preset spatialization trajectories provided in Table 1 are merely examples. Any number of preset spatialization trajectories may be used—each of which is associated with one or more audio features extracted from the source audio track and a target end-state effect.

In other embodiments, the spatialization trajectory is determined using a combination approach that includes lookup from a set of preset spatialization trajectories and parameter modification of the selected trajectory using one or more of the audio feature(s) extracted from the source audio track. An example algorithm that uses this approach is provided below:

1. A tuple of tempo range category, musical genre category, and target end-state effect category are used to index into a table of trajectories, where a single trajectory instance is specified as a list of three dimensional Bezier spline control points.
2. The percussiveness parameter is bivalent normalized to the range from −1.0 to 1.0. It is then used as a scaling parameter to the azimuth of the trajectory, controlling the specific lateral excursion of the trajectory with respect to the listener's position.

3. The event density parameter is bivalent normalized to the range from −1.0 to 1.0. It is then used as a scaling parameter to the elevation of the trajectory, controlling the specific vertical excursion of the trajectory with respect to the listener's position.
4. The harmonic mode parameter is converted to a binary value—i.e., a binary value of "0" if the mode is one of the major modes (Ionian, Lydian, Mixolydian) or a binary value of "1" if the mode is one of the minor modes (Aeolian, Dorian, Phrygian, Locrian). If the binary value is "0", the trajectory is not filtered. However, if the binary value is "1", a low pass filter is applied to the trajectory, on each of the three dimensions, with the cutoff frequency scaled by the tempo parameter (measured in beats per minute), multiplied by the loudness parameter, in order to smooth the trajectory to a degree determined by features of the music.
5. The tempo parameter (measured in beats per minute) is used to compute the specific rate of the path traversal in seconds.

Figure 6:
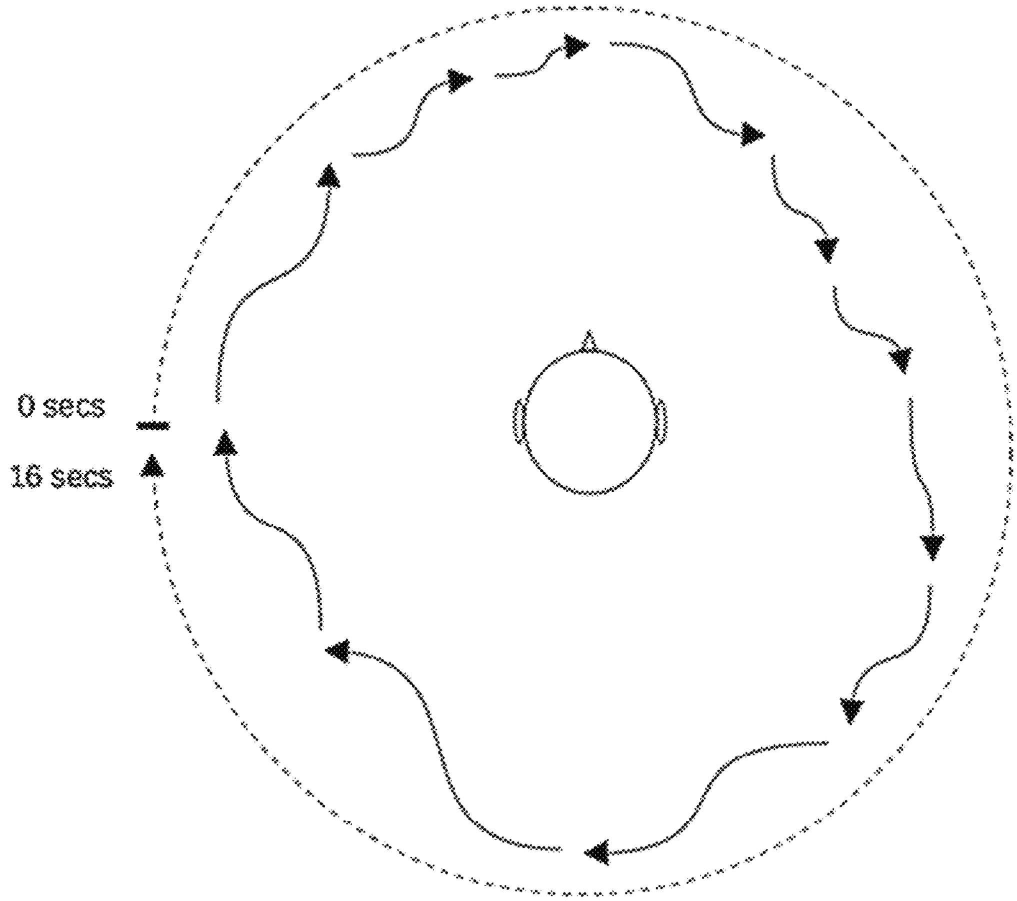
FIG. 6 depicts an exemplary spatialization trajectory generated by the trajectory planner of FIG. 5.

An example trajectory loop that may be generated using the above algorithm is shown in FIG. 6. As can be seen, the tempo extracted from the source audio track determines the duration of the trajectory loop, which is 16 seconds in this example. The remaining extracted audio features determine the control points of the trajectory loop in terms of degree of excursion, rate of change of the position of the music, complexity of the trajectory in terms of overlap, or repeated paths. Of course, it should be understood that other algorithms will result in a different trajectory loop than the example shown in FIG. 6. Typically, multiple trajectory loops are generated for a source audio track—i.e., a trajectory loop for each musical section of the source audio track. The trajectory loops generated in step 506 are passed to a spatializer for further processing in step 512.

In step 510, the source audio track is filtered to remove bass frequencies. It should be understood that this step uses the same process described above in connection with step 328 of the method shown in FIG. 3. Then, in step 512, a spatializer is used to spatialize the non-bass frequency content of the source audio track to generate a spatialized track 514. In the exemplary embodiment, the spatializer uses a head-related transfer function (HRTF) spatialization algorithm, such as Dolby Atmos Personalized Rendering available from Dolby Laboratories, Inc. of San Francisco, California or dearVR Pro available from Dear Reality of Dusseldorf, Germany, in which each trajectory loop generated in step 506 is used to set the position of the sound within a virtual room. It should be noted that the position of the sound may be animated at a rate and distance that is determined from the tempo of the source audio track. Thus, the sound source is perceived to move in time with the music—i.e., the spatialized track provides tempo-based spatialization as the added sound.

In some embodiments, the process may use more than one filter to provide multiple tracks that are spatialized simultaneously. For example, a first filter may remove frequencies below 120 Hz to provide a first track, a second filter may pass frequencies of 20 Hz to 120 Hz to provide a second track, a third filter may remove frequencies outside of 400 Hz to 1,000 Hz to provide a third track, and a fourth filter may remove frequencies outside of 1,000 Hz to 4,000 Hz to provide a fourth track. A different spatialization trajectory may be used to spatialize each of these tracks to thereby generate multiple spatialized tracks. Other examples will be apparent to one skilled in the art.

Figure 7:
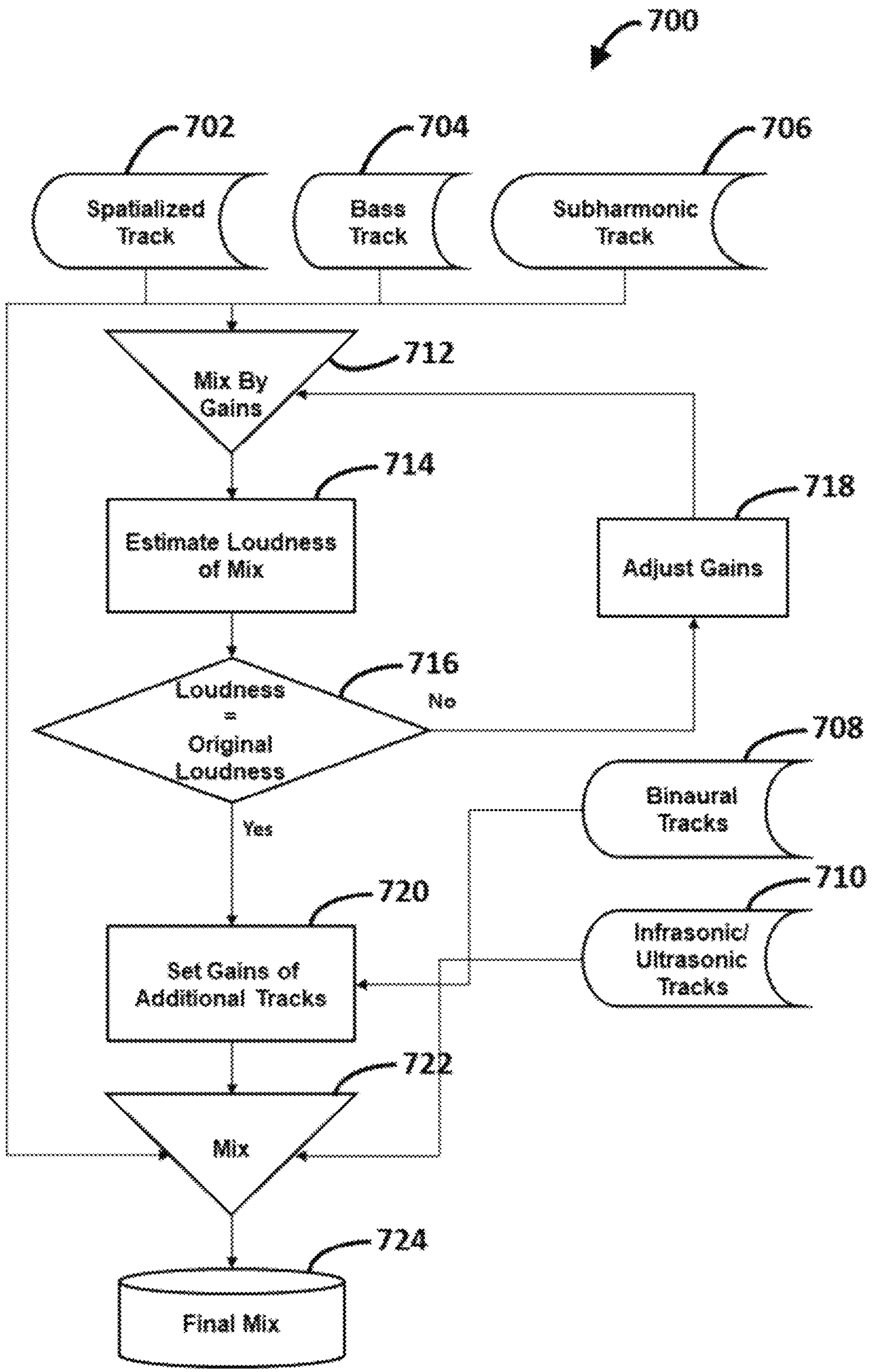
FIG. 7 is a flow diagram of an exemplary process for setting the gains of the audio tracks.

Referring to FIG. 7, one embodiment of a process for setting the gains of the audio tracks in accordance with the present invention is shown generally as reference number 700. This process may be performed, for example, in place of steps 312, 316,322, 326 and 332 of the method shown in FIG. 3. It will be seen that this process uses an iterative gain setting algorithm to set the gains of the audio tracks in order to ensure that mixing of the audio tracks does not result in an overdriven signal.

As an initial matter, the spatialized track is obtained in step 702, the enhanced bass track is obtained in step 704, the subharmonic track is obtained in step 706, the binaural beat tracks are obtained in step 708, and the infrasonic and/or ultrasonic tracks are received in step 710.

In step 712, the spatialized track, enhanced bass track, and subharmonic track are mixed by gains. In step 714, the loudness of the mix is estimated using any loudness estimation algorithm known in the art (e.g., the WLM Loudness Meter software available from Waves Audio Ltd. of Tel Aviv, Israel). In step 716, it is determined whether the loudness of the mix matches the loudness of the source audio track. If not, in step 718, the gains of the spatialized track, enhanced bass track, and subharmonic track are iteratively adjusted until the levels substantially match the loudness of the source audio track. Any multi-parameter estimation method, including machine learning, for example, stochastic gradient descent of multilayer perceptrons, may be used to determine the gain adjustment in each iteration. Of course, it is also possible to use more simplified methods, such as a hill-climbing estimate, to adjust the gains.

When the loudness of the mix matches the loudness of the source audio track, in step 720, the final gain of the mix is used to set the gains of the binaural beat tracks and the infrasonic and/or ultrasonic tracks. In the exemplary embodiment, the gains of the binaural beat tracks and the infrasonic and/or ultrasonic tracks are determined by multiplying the final gain of the mix by a constant, i.e., a fixed loudness ratio that may be derived by experimentation with existing datasets or by data analysis. For example, if the final gain of the mix is −6 dB and the constant is 9, the gains of the binaural beat tracks and the infrasonic and/or ultrasonic tracks will be −54 dB.

In step 722, the various audio tracks—i.e., binaural beat tracks, infrasonic and/or ultrasonic tracks, subharmonic track, enhanced bass track, and spatialized track—are mixed to produce an enhanced audio track. Then, in step 724, the enhanced audio track is stored as an audio file. It should be understood that steps 722 and 724 use the same processes described above in connection with steps 334 and 336 of the method shown in FIG. 3.

The description set forth above provides several exemplary embodiments of the inventive subject matter. Although each exemplary embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The use of any and all examples or exemplary language (e.g., "such as") provided with respect to certain embodiments is intended merely to better describe the invention and does not pose a limitation on the scope of the invention. Also, the use of relative relational terms, such as "first" and "second," are used solely to distinguish one unit or action from another unit or action without necessarily requiring or implying any actual such relationship or order between such units or actions. No language in the description should be construed as indicating any non-claimed element essential to the practice of the invention.

The use of the terms "comprises," "comprising," or any other variation thereof, are intended to cover a non-exclusive inclusion, such that a process, method, or system that comprises a list of elements does not include only those elements, but may include other elements not expressly listed or inherent to such process, method, or system.

While the present invention has been described and illustrated hereinabove with reference to several exemplary embodiments, it should be understood that various modifications could be made to these embodiments without departing from the scope of the invention. Therefore, the present invention is not to be limited to the specific configurations or methodologies of the exemplary embodiments, except insofar as such limitations are included in the following claims.

What is claimed and desired to be secured by Letters Patent is as follows:

1. A computer-implemented method for infusing sound into audio tracks, comprising:

obtaining a source audio track;

synthesizing a plurality of binaural beat tracks each of which corresponds to one of a plurality of audio tracks separated from the source audio track, wherein a binaural beat track is generated from an audio track by (a) transcribing the audio track to provide a transcription that includes one or both of an estimated fundamental frequency and an estimated amplitude envelope for each of a plurality of notes in the audio track and (b) using the transcription to generate the binaural beat track;

generating a spatialized track by (a) filtering the source audio track to provide a filtered track, (b) generating a spatialization trajectory by (i) extracting one or more audio features from the source audio track, (ii) identifying a target end-state effect, and (iii) using the audio features extracted from the source audio track and the target end-state effect to determine the spatialization trajectory, and (c) spatializing the filtered track using the spatialization trajectory to generate the spatialized track; and generating an enhanced bass track based on the source audio track;

generating a mixed track by mixing the binaural beat tracks, the spatialization track, and the enhanced bass track; and providing the mixed track for delivery to an end user device.

2. The method of claim 1, further comprising:

generating a subharmonic track based on the source audio track; and mixing the subharmonic track with the binaural beat tracks, the spatialization track, and the enhanced bass track to generate the mixed track.

3. A computer-implemented method for infusing sound into audio tracks, comprising:

obtaining a source audio track;

synthesizing a plurality of binaural beat tracks each of which corresponds to one of a plurality of audio tracks separated from the source audio track, wherein a binaural beat track is generated from an audio track based on one or both of an estimated fundamental frequency and an estimated amplitude envelope for each of a plurality of notes transcribed from the audio track, wherein at least one of the binaural beat tracks comprises a first plurality of sinusoidal signals synthesized simultaneously on a first binaural channel and a second plurality of sinusoidal signals synthesized simultaneously on a second binaural channel;

generating a spatialized track by filtering the source audio track to provide a filtered track, generating a spatialization trajectory based on one or more audio features extracted from the source audio track and a target end-state effect, and spatializing the filtered track using the spatialization trajectory to generate the spatialized track; and generating a mixed track by mixing the binaural beat tracks and the spatialization track;

providing the mixed track for delivery to an end user device.

4. The method of claim 3, further comprising:

generating one or both of an infrasonic track and an ultrasonic track.

5. The method of claim 4, further comprising:

generating one or both of an enhanced bass track and a subharmonic track based on the source audio track.

6. The method of claim 5, wherein the mixed track is generated by:

mixing the binaural beat tracks, the spatialized track, the one or both of the infrasonic track and the ultrasonic track, and the one or both of the enhanced bass track and the subharmonic track.

7. A computer-implemented method for synthesizing binaural beat tracks, comprising:

synthesizing a plurality of binaural beat tracks each of which corresponds to one of a plurality of audio tracks separated from a source audio track, wherein at least one of the binaural beat tracks is generated from at least one of the audio tracks by (a) transcribing the audio track to provide a polyphonic pitch transcription that includes one or both of an estimated fundamental frequency and an estimated amplitude envelope for each of a plurality of notes, including simultaneously sounding notes, in the audio track and (b) using the polyphonic pitch transcription to control a generation of the binaural beat track, wherein the binaural beat track comprises a first plurality of sinusoidal signals synthesized simultaneously on a first binaural channel and a second plurality of sinusoidal signals synthesized simultaneously on a second binaural channel; and outputting the binaural beat tracks.

8. The method of claim 7, further comprising:

separating the audio tracks from the source audio track.

9. The method of claim 7, wherein each of the audio tracks comprises one of an instrumental track, a mix of a plurality of instrumental tracks, a vocal track, or a mix of a plurality of vocal tracks.

10. The method of claim 7, further comprising:

identifying a binaural beat frequency parameter representative of a magnitude of frequency deviation;

adding the binaural beat frequency parameter to the estimated fundamental frequency for each of the notes to determine a plurality of time-varying frequencies for the first plurality of sinusoidal signals synthesized simultaneously on the first binaural channel; and subtracting the binaural beat frequency parameter from the estimated fundamental frequency for each of the notes to determine a plurality of time-varying frequencies for the second plurality of sinusoidal signals synthesized simultaneously on the second binaural channel.

11. The method of claim 7, further comprising:

identifying a binaural beat volume parameter; and using the binaural beat volume parameter to control a plurality of amplitudes of the first plurality of sinusoidal signals synthesized simultaneously on the first binaural channel and the second plurality of sinusoidal signals synthesized simultaneously on the second binaural channel.

12. The method of claim 7, further comprising:

using the estimated amplitude envelope for each of the notes transcribed by polyphonic pitch transcription to control a plurality of time-varying amplitudes for the first plurality of sinusoidal signals synthesized simultaneously on the first binaural channel and the second plurality of sinusoidal signals synthesized simultaneously on the second binaural channel.

13. The method of claim 7, wherein the polyphonic pitch transcription includes an estimated fundamental frequency for each of a plurality of outlier notes, and wherein the method further comprises:

filtering the outlier notes from the polyphonic pitch transcription prior to generating the binaural beat track.

14. The method of claim 13, further comprising identifying the outlier notes in the polyphonic pitch transcription by:

analyzing the polyphonic pitch transcription to determine a mean fundamental frequency and a standard deviation from the mean fundamental frequency for a plurality of transcribed notes; and identifying one or more of the transcribed notes in which the estimated fundamental frequency of the transcribed note is either (a) greater than a first value comprising the mean fundamental frequency plus a first multiplier of the standard deviation or (b) less than a second value comprising the mean fundamental frequency minus a second multiplier of the standard deviation.

15. The method of claim 8, further comprising:

filtering the source audio track to provide a filtered track;

spatializing the filtered track using a spatialization trajectory to generate a spatialized track; and outputting the spatialized track.

16. The method of claim 15, further comprising:

providing the binaural beat tracks and the spatialized track to enable simultaneous play of the spatialized track and the binaural beat tracks by a listener.

17. The method of claim 15, further comprising:

mixing the binaural beat tracks and the spatialized track to generate a mixed track; and providing the mixed track for delivery to an end user device.

18. The method of claim 15, further comprising:

iteratively adjusting a first gain value associated with the spatialized track until a loudness of the spatialized track matches a loudness of the source audio track;

setting a second gain value associated with the binaural beat tracks based on the first gain value and a fixed ratio; and using the first and second gain values to modify an amplitude of each of the spatialized track and the binaural beat tracks, respectively.

19. A computer-implemented method for generating a spatialized track, comprising:

obtaining a source audio track;

filtering the source audio track to provide a filtered track;

generating a spatialization trajectory by (a) extracting one or more audio features from the source audio track, (b) identifying a target end-state effect intended to evoke in a listener one or more desired psychological, neurological or physiological outcomes, and (c) using the one or more audio features extracted from the source audio track and the target end-state effect to determine the spatialization trajectory by (i) accessing a database that stores a plurality of preset spatialization trajectories each of which is associated with one or more audio features and an end-state effect and (ii) selecting a preset spatialization trajectory from the database in which the one or more audio features extracted from the source audio track match the one or more audio features of the preset spatialization trajectory and the target end-state effect matches the end-state effect of the preset spatialization trajectory;

spatializing the filtered track using the spatialization trajectory to generate a spatialized track; and outputting the spatialized track.

20. The method of claim 19, wherein a plurality of spatialization trajectories are generated and used to spatialize the filtered track.

21. The method of claim 19, wherein each of the one or more audio features extracted from the source audio track comprises one of a tempo, a musical event density, a harmonic mode, a loudness, and a percussiveness measurement.

22. The method of claim 19, wherein the spatialization trajectory comprises a two-dimensional trajectory.

23. The method of claim 19, wherein the spatialization trajectory comprises a three-dimensional trajectory.

24. The method of claim 19, wherein the spatialization trajectory is further determined by:

modifying the selected preset spatialization trajectory based on one or more of the audio features extracted from the source audio track.

25. The method of claim 19, further comprising:

synthesizing a plurality of binaural beat tracks each of which corresponds to one of a plurality of audio tracks separated from the source audio track; and outputting the binaural beat tracks.

26. The method of claim 25, further comprising:

providing the spatialized track and the binaural beat tracks to enable simultaneous play of the spatialized track and the binaural beat tracks by the listener.

27. The method of claim 25, further comprising:

mixing the spatialized track and the binaural beat tracks to generate a mixed track; and providing the mixed track for delivery to an end user device.

28. A computer-implemented method for generating a spatialized track, comprising:

obtaining a source audio track;

filtering the source audio track to provide a filtered track;

generating a spatialization trajectory by (a) extracting one or more audio features from the source audio track, (b) identifying a target end-state effect intended to evoke in a listener one or more desired psychological, neurological or physiological outcomes, and (c) using the one or more audio features extracted from the source audio track and the target end-state effect to determine the spatialization trajectory;

spatializing the filtered track using the spatialization trajectory to generate a spatialized track;

synthesizing a plurality of binaural beat tracks each of which corresponds to one of a plurality of audio tracks separated from the source audio track;

iteratively adjusting a first gain value associated with the spatialized track until a loudness of the spatialized track matches a loudness of the source audio track;

setting a second gain value associated with the binaural beat tracks based on the first gain value and a fixed ratio;

using the first and second gain values to modify an amplitude of each of the spatialized track and the binaural beat tracks, respectively; and outputting the spatialized track and the binaural beat tracks.

* * * * *